May 28, 1946.  W. P. LEAR  2,401,003
ELECTROMAGNETIC CLUTCH
Filed June 16, 1943

INVENTOR.
WILLIAM P. LEAR
BY
Richard A. Marsen
ATTORNEY

Patented May 28, 1946

2,401,003

UNITED STATES PATENT OFFICE 2,401,003

ELECTROMAGNETIC CLUTCH

William P. Lear, Piqua, Ohio, assignor, by mesne assignments, to Lear, Incorporated, Grand Rapids, Mich., a corporation of Illinois Application June 16, 1943, Serial No. 490,974

6 Claims. (Cl. 192—18)

This invention relates to clutches, and more particularly to an improved electromagnetic non-slip clutch.

As a result of test investigations, it has been found that the slippage between the driving and driven members of a clutch bears a direct relation to the relative concentricity of these members. If the members are so mounted that they are concentric in all positions of relative displacement, the slippage between the driving and driven members, when engaged, is reduced to substantially zero. This results in increased efficiency and reduced wear of the clutching surfaces. The present invention is an improvement of the clutch disclosed in my U. S. Patent No. 2,267,114.

It is therefore among the objects of this invention to provide an improved electromagnetic clutch construction in which the driving and driven members are maintained in a concentric relation in all positions of relative displacement; to provide an improved electromagnetic clutch having a driving member and a driven member supported on a common bearing support concentric with both members; and to provide an improved electromagnetic clutch in which there is substantially no slippage between the driving and driven members when the clutch is energized.

These and other objects, advantages and features of the invention will be apparent from the following description and accompanying drawing. In the drawing.

Figures 1, 2, 3, 4:
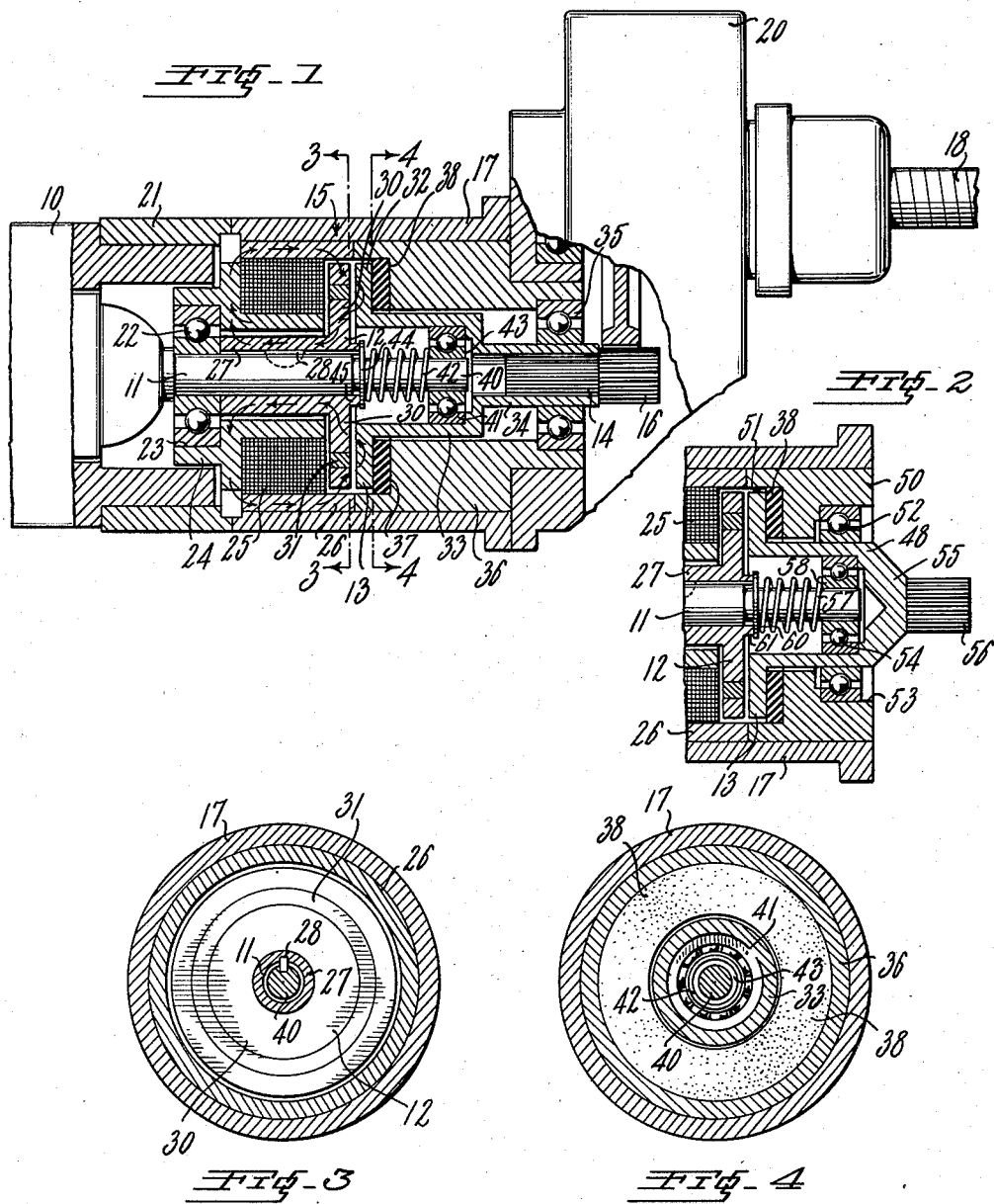
Fig. 1 is an elevation view, partly in section, of a motor drive system embodying the improved electromagnetic clutch of the present invention.
Fig. 2 is a sectional view of a portion of Fig. 1 illustrating a modified construction.
Fig. 3 is a cross-sectional view on the line 3—3 of Fig. 1.
Fig. 4 is a cross-sectional view on the line 4—4 of Fig. 1.

According to the present invention, continuous concentricity of the clutch surfaces in all positions is attained by mounting both members on a common bearing surface. For instance, both members may have a bearing surface on the armature or drive shaft of an electric motor with which the clutch is associated. Referring to Fig. 1, an electric motor 10 is illustrated having an armature or drive shaft 11 to which is connected the driving member 12 of an electromagnetic clutch 15. Driven member 13 of the electromagnetic clutch has a drive shaft 14 secured thereto, and the outer end of shaft 14 is formed as a drive pinion 16. Through suitable gearing contained in a gear housing 20 secured to clutch housing 17, pinion 16 is connected to a driving mechanism such as flexible shafting 18. The gearing connecting pinion 16 to shafting 18 may be any conventional design adapted to produce the desired gear ratio.

Clutch housing 17 is secured to the end bell 21 of motor 10 in any suitable manner, and encloses the respective parts of the electromagnetic clutch. Gear housing 20 is secured to housing 17. Armature shaft 11 is mounted in a suitable bearing 22 secured in a recess 23 in a substantially cylindrical housing member 24. Shaft 11 extends through and beyond member 24, and its reduced outer portion 40 is mounted on a bearing 41 in driven member 13 in a manner described hereinafter. An energizing winding 25 for producing the magnetic flux for clutch 15 to establish frictional engagement of members 12 and 13 is mounted within member 24. Member 24 is made of suitable magnetic material, such as soft iron. To form part of member 24 and complete the magnetic flux circuit, an annular inner shell member 26 is mounted in housing 17 surrounding coil 25 and extending outwardly therebeyond to a point between clutch members 12 and 13.

Clutch member 12 comprises a hub portion 27, secured on shaft 11 by a key 28, and a disk-like clutching surface 30. Driving member 12 is made of suitable magnetic material, such as soft iron. To increase the magnetic attraction and number of flux interlinkages between members 12 and 13, an annular ring 31 of non-magnetic material is inserted in the disk portion 30. This construction is illustrated more clearly in Fig. 3. The construction of the member 12 may be the same as any one of the several driving members illustrated in my Patent No. 2,267,114, issued December 23, 1941. Such constructions, as explained in said patent, are to secure increased flux interlinkage between the driving and driven members of the clutch. This is accomplished by forcing the magnetic flux to pass back and forth between the driving and driven members one or more times.

Driven member 13 comprises a disk portion or clutching surface 32 of substantially the same diameter and spaced a short distance from disk portion 30 of member 12. Surface 32 is magnetically and frictionally coactable with surface 30. A tubular extension 33 is formed on disk 32 and reduced at its outer end to form a hub 34. Hub 34 is mounted in a suitable bearing 35 which in turn is secured in an annular housing 36 mounted in casing 17 and abutting inner shell 26. Member 36 is formed with a recess 37 adjacent clutch surface 32. An annular braking surface 38 is mounted in recess 36. Recess 36 is of sufficient depth to permit member 13 to move away the necessary amount from member 12, when the clutch is deenergized, to have the braking surface on disk member 32 engage brake surface 38.

As has been stated, armature shaft 11 extends outwardly beyond member 12, and the outer reduced end 40 of shaft 11 is mounted in a bearing 41 secured in the outer end of extension 33. A coil spring 42 engages at one end the inner race 43 of bearing 41 and at the other end a spring seating washer 44 engaging an annular shoulder 45 on driven member 12. Spring 42 normally urges members 12 and 13 apart, and member 13 into engagement with brake surface 38. It will be noted that the spring extends between two surfaces which have no relative rotation. The relationship of brake surface 38, extension 33, reduced extension 40 of shaft 11, bearing 41 and spring 42 is shown more clearly in Fig. 4.

Member 12 is mounted on shaft 11, and member 13 is mounted on bearing 41, which in turn is mounted on end 40 of shaft 11. This insures a concentricity of the clutch surfaces 30 and 32, as both clutch members are mounted on the same bearing surface. In operation, when winding 25 is energized, member 13 is rapidly pulled into frictional engagement with member 12 to form a driving connection between shaft 11 and pinion 16. The path of the magnetic flux is indicated by the arrows in Fig. 1. The flux passes from housing member 24 into hub 27 of member 12, and thence into disk surface 30. From surface 30, the flux passes to surface 32 of member 13, then back to surface 30, and thence to inner shell 26 completing the circuit. Due to the increased number of flux interlinkages between the clutching surfaces 30 and 32 by reason of incorporating ring 31 of non-magnetic material in disk 30, the clutch engaging action is extremely rapid. As both members are mounted on the same bearing support, they move in parallel planes in coming into engagement, and concentricity is assured. It has been found in tests that the slippage between members 12 and 13, when the clutch is energized, is substantially zero.

When winding 25 is deenergized, spring 42 rapidly moves member 13 away from member 12 and into the position where surface 32 engages brake surface 38. Thus, motion of drive pinion 16 and driving mechanism 18 associated therewith is interrupted substantially instantaneously. The entire device, therefore, comprises a quick acting combined clutch and brake for connecting a motor to a drive system, and for stopping movement of the drive system when the motor is deenergized. Due to the quick action of the clutch, overrunning of clutch is substantially prevented.

Fig. 2 illustrates a modified construction in which the bearings of member 13 in its housing and on the motor shaft are radially aligned. As shown, member 13 is formed with a cylindrical extension 48 which is shorter than extension 33. A housing 50 is secured in housing 17 and has a recess 51 in which is mounted brake surface 38. A roller bearing assembly 52 is mounted on extension 48 and seated in another recess 53 in housing 50.

A roller bearing assembly 54 is disposed between motor shaft 11 and extension 48. Bearing 54 is radially aligned with bearing 52. An end wall 55 on extension 48 maintains bearing 54 in place. Extension 48 terminates in a drive pinion 56, which may be integral with the extension. In this construction, as in that of Figs. 1, 3 and 4, clutch members 12 and 13 are urged apart by a coil compression spring 57 extending between inner race 58 of bearing 54 and a washer 60 engaging a shoulder 61 on hub 27. The construction of Fig. 2 likewise has been found effective in insuring concentricity of the clutch surfaces in all positions, and thus reducing the slippage therebetween to substantially zero.

While specific embodiments of the invention have been shown and described to illustrate how the principles of the invention may be applied, it will be understood by those skilled in the art that the invention may be otherwise embodied without departing from the principles thereof.

What is claimed is:

1. An electromagnetic clutch comprising a driving shaft; a first member of magnetic material having a clutching surface, and keyed to and supported on said driving shaft; a second member of magnetic material having a clutching surface magnetically and frictionally coactable with the first member surface and a tubular extension concentric with said driving shaft; a housing surrounding said second member; a first bearing means between said tubular extension and said driving shaft; a second bearing means between said tubular extension and said housing, said bearing means being radially aligned on said extension; and magnetic flux generating means for producing magnetic flux for establishing frictional engagement between said clutching surfaces.

2. An electromagnetic clutch comprising a driving shaft; a first member of magnetic material having a clutching surface and keyed to and supported on said driving shaft; a housing member of magnetic material surrounding said first member and extending close thereto to establish a relatively low reluctance magnetic air gap therewith; a first bearing means between said housing member and said driving shaft; a second member of magnetic material having a clutching surface magnetically and frictionally coactable with the first member surface, a braking surface and a tubular extension concentric with said driving shaft, said driving shaft having a reduced portion extending into said tubular extension; a second bearing means between said tubular extension and said reduced portion of said driving shaft; a housing surrounding said second member; a third bearing means between said tubular extension and said housing; a second braking surface on said housing adjacent the braking surface on said second member; resilient means normally urging said clutching surfaces apart and said braking surfaces into frictional engagement; and magnetic flux generating means including a winding supported within said housing member for producing magnetic flux for establishing frictional engagement between said clutching surfaces.

3. A clutch comprising a driving shaft; a driving disk keyed thereto; a driven disk coactable with said driving disk and having a hub extension concentric with said shaft; a housing surrounding said driven disk; said driving shaft having a portion extending into said extension; a first bearing between said shaft portion and said extension; a second bearing between said extension and said housing; said bearings being radially aligned on said extension; resilient means biasing said disks apart; and means operative to drivingly engage said disks.

4. A clutch comprising a driving shaft; a driving disk keyed thereto; a driven disk coactable with said driving disk and having a hub extension concentric with said shaft; a housing surrounding said driven disk; said driving shaft having a portion extending into said extension; a housing member surrounding said driving disk; a first bearing between said housing member and shaft; a second bearing between said shaft portion and said extension; a third bearing between said extension and said housing; resilient means biasing said disks apart; and means operative to drivingly engage said disks.

5. A clutch comprising a driving shaft; a driving disk keyed thereto; a driven disk coactable with said driving disk and having a hub extension concentric with said shaft; a housing surrounding said driven disk; said driving shaft having a portion extending into said extension; a braking surface on said housing adjacent said driven disk; a first bearing between said shaft portion and said extension; a second bearing between said extension and said housing; said bearings being radially aligned on said extension; resilient means biasing said disks apart and said driven disk into engagement with said braking surface; and means operative to drivingly engage said disks.

6. A clutch comprising a driving shaft; a driving disk keyed thereto; a driven disk coactable with said driving disk and having a hub extension concentric with said shaft; a housing surrounding said driven disk; said driving shaft having a portion extending into said extension; a housing member surrounding said driving disk; a braking surface on said housing adjacent said driven disk; a first bearing between said housing member and shaft; a second bearing between said shaft portion and said extension; a third bearing between said extension and said housing; resilient means biasing said disks apart and said driven disk into engagement with said braking surface; and means operative to drivingly engage said disks.

WILLIAM P. LEAR.